United States Patent Office 3,734,883
Patented May 22, 1973

3,734,883
STABILIZING ORGANIC MATERIAL WITH
PIPERIDONE AZINES
Brian Holt, Royton, Lancs, England, assignor to
Ciba-Geigy Corporation, Ardsley, N.Y.
No Drawing. Filed Apr. 9, 1971, Ser. No. 132,801
Claims priority, application Great Britain, Apr. 16, 1970,
18,090/70; July 24, 1970, 35,954/70
Int. Cl. C08f 45/60
U.S. Cl. 260—45.8 N          4 Claims

ABSTRACT OF THE DISCLOSURE

A process for stabilising organic material by incorporating into said material a minor proportion of certain piperidone azines, thereby imparting to the material an unexpectedly high degree of stability to exposure to light radiation, as well as stabilising compositions comprising an organic material and a minor proportion of said piperidone azines, are disclosed.

---

The present invention relates to the use of piperidone azines for stabilising organic material.

Compounds of the general formula

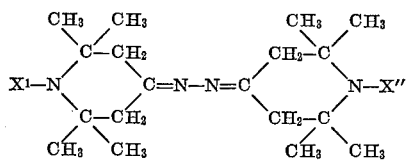

wherein $X^1$ and $X''$ are the same or different and each is O or H, have already been described by R. Brière et al., Bulletin Société Chimique, 11, pages 3290 to 3297 (1965). These workers only prepared the compounds however, and examined their spectra; they provided no suggestion of any practical use for the compounds. Another compound within the same general formula but wherein $X^1$ and $X''$ are both methyl has been described by Lutz et al., Journal of Organic Chemistry, 27, pages 1695 to 1703 (1962), and examined for ganglionic and neuromuscular activity.

We have now found that the compounds disclosed by Brière et al. and Lutz et al. together with certain closely related compound, when incorporated into organic material, impart to the material an unexpectedly high degree of stability to exposure to light radiation.

Accordingly, the present invention provides use of a minor proportion of an azine of Formula I

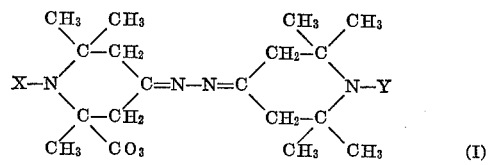

wherein either X and Y are the same and each is O, hydrogen or methyl, or X is O and Y is hydrogen, for stabilising organic material as well as a composition comprising an organic material and a minor proportion of an azine of Formula I.

The compounds of Formula I are:

2,2,6,6 tetramethyl piperidone azine-4,
2,2,6,6 tetramethyl piperidone azine-4-dioxyl-1,1′,
2,2,6,6 tetramethyl piperidone azine-4-mono oxyl-1, and
1,2,2,6,6 pentamethyl piperidone aizne-4,
2,2,6,6 tetramethyl piperidone azine-4 being particularly preferred.

The azine compounds of Formula I in which X and Y are the same may be produced, for instance, by reacting a ketone of Formula II

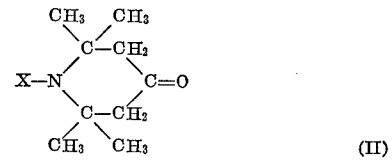

wherein X has its previous significance, with hydrazine, preferably in the form of its hydrate, by methods known per se.

The compounds of Formula II wherein X and Y are both O or CH₃ may in turn be produced from the known compound of Formula II wherein X and Y are both H by reacting the latter either with a peroxide such as hydrogen peroxide or with a methyl halide.

Compounds of Formula I in which X and Y are both O or CH₃ may also be produced by reacting the compound of Formula I wherein X and Y are both H with a peroxide such as hydrogen peroxide or a methyl halide respectively.

Moreover, compounds of Formula I wherein X is O and Y is H may be produced by reacting the compound of Formula I wherein X and Y are both H with a peroxide such as hydrogen peroxide and separating the respective mixtures containing compounds wherein X and Y are both O and X is H and Y is O by methods well known per se.

Compounds of Formula I have been found to impart to polyolefines, especially to polyethylene or polypropylene, an exceptionally high degree of stability towards deterioration normally induced by the effects of ultaviolet radiation. Moreover, this light stability is achieved without affecting the colour properties of the treated polyolefine. The compounds of Formula I provide effective light stabilisation of low and high density polyethylene and polypropylene as well as polymers of butene-1, pentene-1,3-methylbutene-1, hexene-1, 4-methylpentene-1, 4-methylhexene-1 and 4,4-dimethylpentene-1, and co- and ter-polymers of olefines, especially of ethylene or propylene.

Other organic materials susceptible to degradation by the effects of light and the properties of which are improved by the incorporation therein of a compound of Formula I include natural, and synthetic polymeric materials, for instance natural and synthetic rubbers, the latter include, for example homo-, co- and terpolymers of acrylonitrile, butadiene and styrene.

Specific synthetic polymers include polyvinyl chloride, polyvinyl acetate and condensation polymers derived from ether, ester (ex carboxylic, sulphonic or carbonic acids), amide or methane groupings. These polymers can for instance form the basis of surface coating media such as paints and lacquers having an oil or resin base, for instance an alkyd or polyamide resin base.

The amount of the compound of Formula I which is incorporated into the organic material in order to achieve maximal protection against degradation by light varies according to the properties of the organic material treated, with the severity of the light radiation and with the duration of exposure. However, for most purposes it is sufficient to use an amount of the compound of Formula I within the range of from 0.01% to 5% by weight, more preferably within the range of from 0.1% to 2% by weight, based on the weight of untreated organic material.

Optionally, the composition of the invention may contain further additives, especially those used in polyolefine formulations, such as antioxidants, further light stabilisers and metal complexants/deactivators, pigments, anti-slipping and anti-static agents, fillers, dyes and glass or other fibres.

3

The compound of Formula I may be incorporated into the polymeric material by any of the known techniques for compounding additives with a polymer. For example, the compound of Formula I and the polymer may be compounded in an internal mixer. Alternatively, the compound of Formula I may be added as a solution or slurry in a suitable solvent or dispersant, for instance an inert organic solvent such as methanol, ethanol or acetone to powdered polymer and the whole mixed intimately in a mixer, and the solvent subsequently removed. As a further possibility the compound of Formula I may be added to the polymer during the preparation of the latter, for instance at the latex stage of polymer production, to provide prestabilised polymer material.

Examples of suitable antioxidants include those of the hindered phenol type such as 2,6-di-t-butyl-p-cresol, 4,4'-bis(2,6-di-t-butyl-phenol), 4,4' - bis(2,6 - diisopropylphenol), 2,4,6-triisopropylphenol, and 2,2'-thio-bis-(4-methyl-5-tertiary butylphenol) and tetrakis [methylene-3-(3',5' - dibutyl - 4' - hydroxyphenyl)propionate] methane; esters of thio-dipropionic acid, for example dilauryl thiodi propionate; alkyl, aryl or alkaryl phosphites such as triphenyl phosphite, trinonyl phosphite and diphenyldecyl phosphite and combinations of these antioxidants.

Further light stabilisers include those of the substituted benzotriazole class such as 2-(2'-hydroxy-5'-methyl phenyl)benzotriazole, 2-(2'-hydroxy-3',5'-di-t-butyl-phenyl)-5-chloro-benzotriazole; those of the hydroxy benzophenone type; hindered phenols such as 2',4'-di-t-butylphenyl-3,5-di-t-butyl-4-hydroxy benzoate and the stabilisers described in our copending British patent application No. 28,063/70 and suitable metal complexants/deactivators include salicylidene-propylene diamine, 5,5'-methylene-bis-benzotriazole, salts of salicylaminoguanidine and nickel compounds, for example nickel complexes of 2,2'-thiobis-(4-tertiary octyl phenol), such as the 1:1- and 1:2-complex, optionally with other ligands such as n-butylamine, nickel complexes of bis-(4-tertiary octylphenyl)-sulphone such as the 2:1-complex, optionally with other ligands such as 2-ethyl caproic, nickel dibutyl dithiocarbamate, nickel salts of 4-hydroxy-3,5-di-tertiary butyl benzyl phosphonic acid mono alkyl esters, such as the methyl-, ethyl- or butyl esters, the nickel complex of 2-hydroxy-4-methyl-phenyl-undecyl ketone oxime.

As with the compound of Formula I, any further additive is advantageously employed in a proportion within the range of from 0.01% to 5% by weight, based on the weight of untreated organic material.

In combination with an antioxidant suitable for use in inhibiting oxidative corrosion of polyolefines, for instance those of the hindered phenol type, the compounds of Formula I provide extremely effective all round stabilising packages for polyolefines, especially polypropylene.

In the following examples parts and percentages are by weight unless otherwise stated.

EXAMPLE 1

A mixture of 12 parts of 2,2,6,6-tetramethyl piperidone-4 and 1.9 parts of hydrazine hydrate is heated on a steambath for 3 hours. The resultant reaction product is then recrystallised twice from petroleum ether (boiling range 60° to 80° C.) to yield 2,2,6,6-tetramethyl piperidone-azine-4 as pale yellow needles, having a melting point of 135° to 136° C. and the following elemental analysis by weight:

Calculated (for $C_8H_{34}N_4$) (precent): carbon, 70.50; hydrogen, 11.18; nitrogen, 18.28. Found (percent): carbon, 70.47; hydrogen, 10.95; nitrogen, 18.57.

This compound and two known additives were tested as light stabilisers in comparison with a blank by the following procedure.

0.15% weight/volume solutions of the additives in acetone were made up and 40 parts by volume of each of the solutions were added to 40 parts by weight of a powdered polypropylene which was substantially free from stabilising additives. A further 60 parts by volume of acetone was then added to each to form slurries which were hand-mixed to ensure homogeneity. The solvent was then removed from each by evaporation in a rotary evaporator heated by a boiling water bath, the last traces of solvent being removed by passing a slow stream of nitrogen through the evaporator, to leave dry powders.

14 grams by weight of dried powder were weighed into a mould measuring 15 x 15 x 0.0375 cm. The mould and polishing plate were then heated in a press under contact pressure for 5 minutes. A pressure of 20 tons per square inch was applied for one minute, cooling was commenced and pressure increased so that when the temperature reached 150° C., the pressure was 80 tons per square inch. Cooling was continued until the temperature of the mould reached 50° C. and the mould was released from the press.

The samples of moulded sheet so obtained were exposed to light irradiation in a device consisting of a circular bank of 28 alternate sunlight and blacklight lamps. The sunlight lamps were 2 feet long 20 watt fluorescent lamps, having a peak emission of 3100 angstrom units and the blacklight lamps were 2 feet long 40 watt ultra-violet lamps having a peak emission of 3500 angstrom units. The samples were rotated concentrically within the bank of lamps so that the radiation was uniformly distributed over them.

The exposed samples were examined periodically and bent through 180° and the time at which each snapped due to embrittlement was noted.

The results observed are set out in the following Table I.

TABLE I

| Additive: | Time to embrittlement (hours) |
|---|---|
| None | 82 |
| 2 - (2' - hydroxy - 5' - methyl phenyl) benzotriazole | 143 |
| 2 - (2' - hydroxy - 3',5'-di-t-butyl phenyl)-5-chlorobenzotriazole | 289 |
| 2,2,6,6 - tetramethyl piperidone azine-4 | 930 |

These results clearly demonstrate the outstandingly good light stability properties of the composition of the present invention compared with previously known compositions.

EXAMPLES 2 TO 5

Preparation of 1,2,2,6,6-pentamethyl piperidone-azine-4

1,2,2,6,6-pentamethyl piperidone-azine-4 is prepared by heating at 85°–88° C. a mixture of 16.9 parts by weight of N-methyl 2,2,6,6-tetramethyl piperidone-4 and 2.5 parts by weight of hydrazine hydrate and 2 parts by volume of ethanol for a period of 4 hours. The reaction and workup procedures described by Lutz et al., Journal of Organic Chemistry, 27 (1962), page 1700, were followed.

Preparation of 2,2,6,6 - tetramethyl piperidone-azine-4-mono oxyl-1 and 2,2,6,6-tetramethyl piperidone-azine-4-dioxyl-1,1'

5 parts by weight of 2,2,6,6-tetramethyl piperidone-4 dissolved in 50 parts by volume of distilled water are treated with 1 part by weight phosphototungstic acid and 11 parts by volume of 30% hydrogen peroxide. To this mixture, 5 parts by weight of solid potassium hydroxide are added and the mixture stirred for 3 hours. The reaction is then extracted with ether and the ether phase washed successively with water and a saturated salt solution, and dried over anhydrous sodium sulphate before finally removing the ether solvent by evaporation. This method is described by Briere et al., Bulletin Société Chimique, 11 (1965), page 3294.

The reaction mixture is then submitted to preparative thin layer chromatography and gives samples of 2,2,6,6-tetramethyl piperidone-azine-4-mono oxyl-1 and 2,2,6,6-tetramethyl piperidone-azine-4-dioxyl-1,1'.

Samples of these compounds together with a sample of 2,2,6,6-tetramethyl piperidone-azine-4 are then incorporated into polypropylene and examined in the light stability test in the manner described in Example 1. All the tests in Example 1 were carried out under the same ambient conditions, and all the tests in Examples 2 to 5 were carried out under the same ambient conditions, but the conditions, temperature, humidity and so on, were not the same for each series of tests. This accounts for the fact that the figures for the blanks are not the same in each series. The absolute values obtained are thus not critical; what is important, and is conclusively demonstrated in each series is the improvement which can be obtained in light stability by incorporating the azines into polypropylene.

The results observed are set out in the following Table II, which also includes results from a control experiment and experiments using a commercially available product 2 - (2' - hydroxy - 3',5'-di-t-butylphenyl)-5-chlorobenzotriazole, and two other previously known compounds which have been recommended as stabilisers for polypropylene.

TABLE II

| Example | Additive | Time to embrittlement (hours) |
|---|---|---|
| | None | 80 |
| | 2-(2'-hydroxy-3',5'-dibutylphenyl)-5-chlorobenzotriazole. | 228 |
| | 1,3,8-triaza-7,7,9,9-tetramethyl-2,4-dioxospiro[4,5]-decane-8-oxyl. | 124 |
| | Cyclohexane-1-spiro-2'-(4'-oxoimidazolidine-1'-oxide)-5'-spiro-1''-cyclohexane. | 252 |
| 2 | 1,2,2,6,6-pentamethylpiperidone-azine-4 | 414 |
| 3 | 2,2,6,6-tetramethylpiperidone-azine-4-mono oxyl-1 | 535 |
| 4 | 2,2,6,6-tetramethylpiperidone-azine-4-dioxyl-1,1' | 464 |
| 5 | 2,2,6,6-tetramethylpiperidone-azine-4 | 677 |

The superiority of the stabilised compositions according to the invention over known compositions is clearly shown by the foregoing data.

What I claim is:

1. A composition comprising a polyolefin and a minor proportion of an azine of Formula I

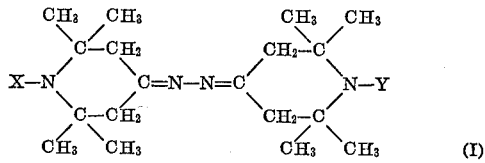

wherein X and Y are the same and each is hydrogen or methyl.

2. A composition as claimed in claim 1 wherein the compound of Formula I is 2,2,6,6-tetramethyl piperidone azine-4.

3. A composition as claimed in claim 1 wherein the polyolefine is polyethylene or polypropylene.

4. A composition as claimed in claim 1 wherein the amount of the compound of Formula I in the composition is within the range of from 0.01% to 5% by weight based on the weight of untreated organic material.

References Cited

UNITED STATES PATENTS

| 3,431,232 | 3/1969 | Murayama et al. | 260—45.8 |
| 3,497,512 | 2/1970 | Hofer et al. | 260—250 |
| 3,448,074 | 6/1969 | Kitaoka et al. | 260—45.8 |
| 3,474,068 | 10/1969 | Murayama et al. | 260—45.8 |

OTHER REFERENCES

Briere et al.: Societe Chimique de France, Bulletin, vol. 11, 1965, pages 3290 and 3291, QD1S4.

DONALD E. CZAJA, Primary Examiner

R. A. WHITE, Assistant Examiner

U.S. Cl. X.R.

260—293.63